United States Patent
Thieblin et al.

(12) 
(10) Patent No.: US 6,780,319 B1
(45) Date of Patent: Aug. 24, 2004

(54) METHOD AND INSTALLATION FOR TREATING EFFLUENTS, COMPRISING AN ADDITIONAL TREATMENT OF THE SLUDGE BY OZONIZATION

(75) Inventors: Eric Thieblin, Plaisir (FR); Anne Mechineau, Croissy (FR); Roger Pujol, Chatou (FR)

(73) Assignee: Ondeo Degremont (FR)

( * ) Notice: Subject to any disclaimer, the term of this patent is extended or adjusted under 35 U.S.C. 154(b) by 186 days.

(21) Appl. No.: 10/148,077
(22) PCT Filed: Oct. 25, 2000
(86) PCT No.: PCT/FR00/02973
§ 371 (c)(1),
(2), (4) Date: Jun. 28, 2002
(87) PCT Pub. No.: WO01/42150
PCT Pub. Date: Jun. 14, 2001

(30) Foreign Application Priority Data

Dec. 7, 1999 (FR) .............................. 99 15427

(51) Int. Cl.[7] .................................. C02F 3/00
(52) U.S. Cl. ...................... 210/627; 210/760; 210/194; 210/197; 210/220; 210/139
(58) Field of Search ................................. 210/623, 624, 210/626, 627, 760, 194, 197, 220, 139

(56) References Cited

FOREIGN PATENT DOCUMENTS

| DE | 19729680 A1 | * | 1/1999 | ........... C02F/09/00 |
| EP | 0 881 195 A1 | * | 12/1998 | |
| EP | 0 887 314 A2 | * | 12/1998 | |
| EP | 0 903 325 A1 | * | 3/1999 | |

* cited by examiner

Primary Examiner—Chester T. Barry
(74) Attorney, Agent, or Firm—Connolly, Bove Lodge & Hutz LLP

(57) ABSTRACT

Method of purifying wastewater charged with organic matter which comprises a step of biologically treating the water, during which the organic matter contained in the water is degraded by micro-organisms thereby producing sludge, and a water-sludge separation step, the sludge coming from the separation step being recycled in the biological treatment step, this method being characterized in that it further comprises a step of degrading the sludge, coming either from the biological treatment step or from the separation step, during which the sludge is brought into contact with an ozonated gas under conditions making it possible to obtain a floc consisting of granules whose mean size is greater than 200 microns, the volatile matter content is between 50 and 65%, the thickening factor of this granular sludge, after 30 minutes of settling, always being greater than 4, the conditions for obtaining the said granular sludge consisting in:

treating between 0.1 and 2 times the mass of sludge present in the biological treatment step per day and preferably between 0.7 and 1.5 and, applying an ozone dose of between 3 and 100 grams of ozone per kilogram of treated suspended matter (SM), preferably between 4 and 10 grams of ozone per kilo of treated SM.

9 Claims, 5 Drawing Sheets

METHOD AND INSTALLATION FOR TREATING EFFLUENTS, COMPRISING AN ADDITIONAL TREATMENT OF THE SLUDGE BY OZONIZATION the subject of the present invention is a method and a plant for purifying wastewater, especially municipal or industrial wastewater, comprising an additional sludge treatment by ozonation in order to reduce the amount of sludge produced by a biological treatment and to increase the flows passing through the sludge clarification system.

The present invention also proposes reducing, on the one hand, the cost of treating excess sludge and, on the other hand, the costs of investing in the water-sludge separation system.

It is known that wastewater treatment largely makes use of activated sludge methods which are based on the principle of the natural flocculation of bacterial populations brought into contact with the water to be purified. Thus a mixture called a mixed liquor is obtained, which is placed under the aeration conditions needed for the biochemical transformation of the organic carbon or nitrogen matter which are contained in the water to be treated.

This involves high-performance methods which are widely used, but the hydraulic treatment capacity of which is frequently limited because of biological problems which negatively affect the settleability of the flocculated sludge (a proliferation of this sludge is produced) and, consequently, reduce the permissible flow rate during clarification which is the final and key step of the treatment.

Moreover, it is known that the biological treatment methods have the drawback of producing large amounts of excess sludge, the final destination of which raises problems with regard to protecting the environment and the removal cost of which is increasingly prohibitive.

In order to solve these problems, various solutions have been proposed. By way of example, the use of chlorine or of ozone to reduce the proliferation of filamentous organisms will be mentioned. By way of an example of this solution, mention may be made of the publication "*Domestic and Industrial Wastewater Treatment with Ozonated Activated Sludge*" by H-van Leeuwen in "Ozone Science and Engineering", Vol. 10, pp 291–308 (1988). With regard to the problem of reducing the production of sludge, reference may be made to EP-A-0 645 347 which describes a method in which the sludge is treated with ozone, coupled with an acidic pretreatment of the sludge, so as to reduce the production of excess sludge. A variant of this known treatment is described in FR-A-2 766 813 which describes a method in which the ozonation treatment is coupled with a mechanical treatment of the sludge.

It will be noted that implementing these known methods enables a marked improvement in the settleability of the sludge (between 20 and 50%) to be obtained.

The possibility of obtaining sludge having the appearance of granules or of granular sludge is also known.

In an anaerobic medium, the method of obtaining these granules consists in adding "nuclei" or even micro-carriers and in applying high ascending speeds to the water to be treated in the anaerobic reactor. An application example of this method is given in the publication "*Granular Sludge Formation in the Anaerobic Expanded Micro-Carrier Process*" in "Water Science Technology" Vol. 23, pp 1167–1177.

In aerobic medium, a first application example of obtaining aerobic granular sludge is given in the publication "*Aerobic Granulation in a Sequencing Batch Reactor*" by J. Beun et al., in "Water Research" Vol. 33, No. 10 pp 2283–2290, 1998. The technology used is of the SBR (Sequencing Batch Reactor) type and the mode of obtaining granular sludge is very dependent on the operating conditions of the plant and necessarily passes through a first step leading to the formation of filamentous granules, with specific moulds of the Fungi type.

Starting from this prior art, the object of the present invention is to solve the problem consisting in directly obtaining flocs having the appearance of granules or of granular sludge, making it possible to improve the settleability of the sludge, and this in an aerobic medium without specific seeding.

According to a first aspect, the present invention relates to a method of purifying wastewater charged with organic matter which comprises a step of biologically treating the water, during which the organic matter contained in the water is degraded by micro-organisms thereby producing sludge, and a water-sludge separation step, the sludge coming from the separation step being recycled in the biological treatment step, this method being characterized in that it further comprises a step of degrading the sludge, coming either from the biological treatment step or from the separation step, during which the sludge is brought into contact with an ozonated gas under conditions making it possible to obtain a floc consisting of granules whose mean size is greater than 200 microns, the volatile matter content is between 50 and 65%, the thickening factor of this granular sludge, after 30 minutes of settling, always being greater than 4, the conditions for obtaining the said granular sludge consisting in:

treating between 0.1 and 2 times the mass of sludge present in the biological treatment per day and preferably between 0.7 and 1.5 and, applying an ozone dose of between 3 and 100 grams of ozone per kilogram of treated suspended matter (SM), preferably between 4 and 10 grams of ozone per kilo of treated SM.

According to the present invention, the ozonation step may be implemented continuously or batchwise.

An explanation of the phenomena discovered by the present proprietor is given below. The action of the ozone causes stress in the bacterial metabolism, characterized by the solubilization of organic and inorganic matter and a substantial modification of the bacterial metabolism. The enzymatic reaction in relation to stress is called maintenance energy. One of the visible causes is the regrouping of the floc in a new granular structure, that is to say physical self-protection of the bacterial fauna against stress.

According to a second feature of the invention, the bacteria will use the substrate from the treated water no longer to reproduce but to withstand the effects of stress by increasing the maintenance energy.

According to a second aspect, the subject of the present invention is a water treatment plant implementing the method defined above.

This plant comprises at least one biological treatment reactor receiving the raw water charged with organic matter which is degraded by micro-organisms thereby producing sludge and a solid/liquid separator which receives the wastewater coming from the biological reactor and which separates the water from the sludge, a recycling loop enabling at least part of the sludge thus separated to be returned to the biological reactor. This plant is characterized in that it comprises a means for degrading the sludge, which collects part of the sludge coming either from the biological reactor or from the separator and subjects this sludge to an ozonation treatment, the sludge thus treated then being recycled in the biological reactor.

Other features and advantages of the present invention will become apparent from the description below made with reference to the appended drawings which schematically illustrate exemplary embodiments thereof free from any limiting character.

Figure 1:
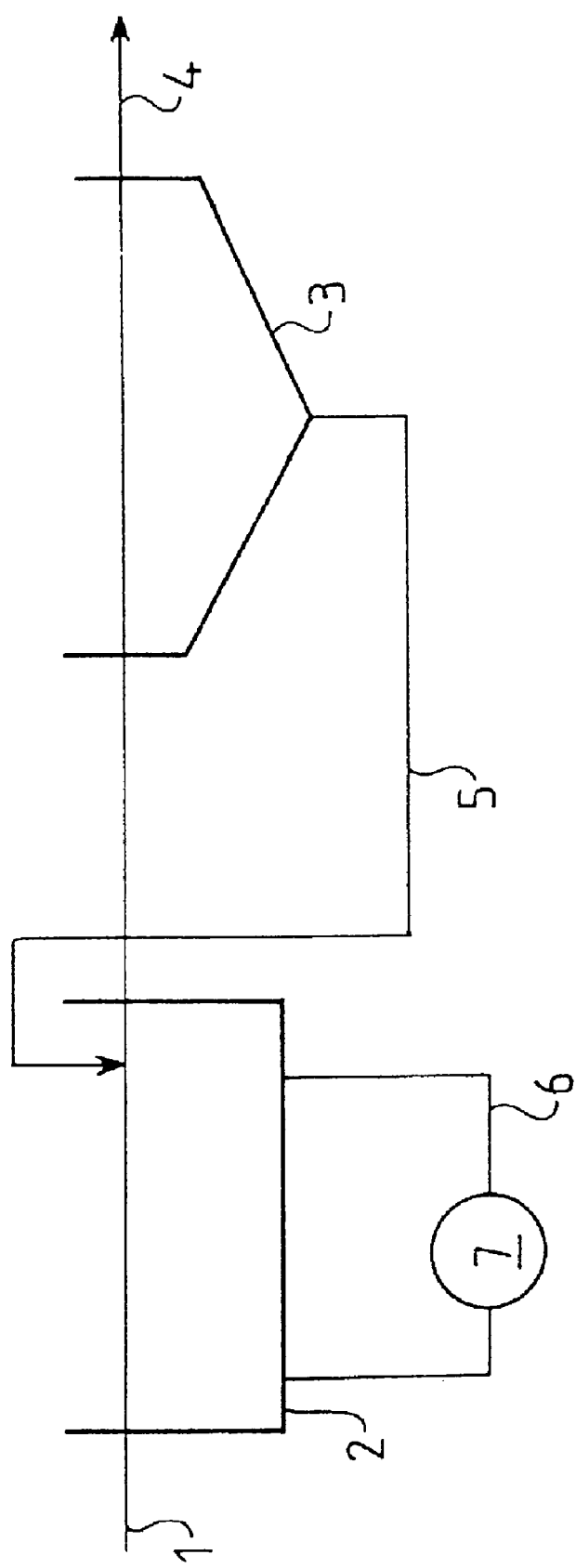
FIG. 1 is a schematic view of an exemplary embodiment of a wastewater treatment plant implementing the method subject of the invention.

With reference to FIG. 1, which shows schematically a wastewater purification station, it can be seen that the latter comprises:

an intake 1 for raw water charged with organic matter;

at least one biological treatment reactor 2, especially such as an aeration tank, a reactor with immobilized cultures or with free cultures, an anaerobic digester or the like, in which the organic matter contained in the raw water is degraded by micro-organisms thereby producing sludge;

a solid-liquid separation means, such as for example a clarifier 3 which receives the wastewater coming from the biological reactor 2 and which separates the water from the sludge;

a treated water outlet 4 which collects the water coming from the clarifier 3; and a loop 5 for recycling sludge coming from the clarifier 3, the sludge then being returned to the top of the biological reactor 2, as can be seen clearly in FIG. 1. This recycling loop 5 provides a flow rate representing from 50 to 300% of the normal flow rate of wastewater having to be treated by the purification station.

According to the invention, the plant further comprises a loop 6 for degrading the sludge which collects part of the sludge from the biological reactor 2 and which returns the sludge into the reactor 2 after it has passed through a sludge ozonation system, denoted overall by the reference 7 in FIG. 1. According to the invention, the sludge, which is degraded by ozonation in the system 7, may come either from the biological treatment of the water to be treated (as illustrated in FIG. 1), or from the sludge separation device 3.

Figure 2:
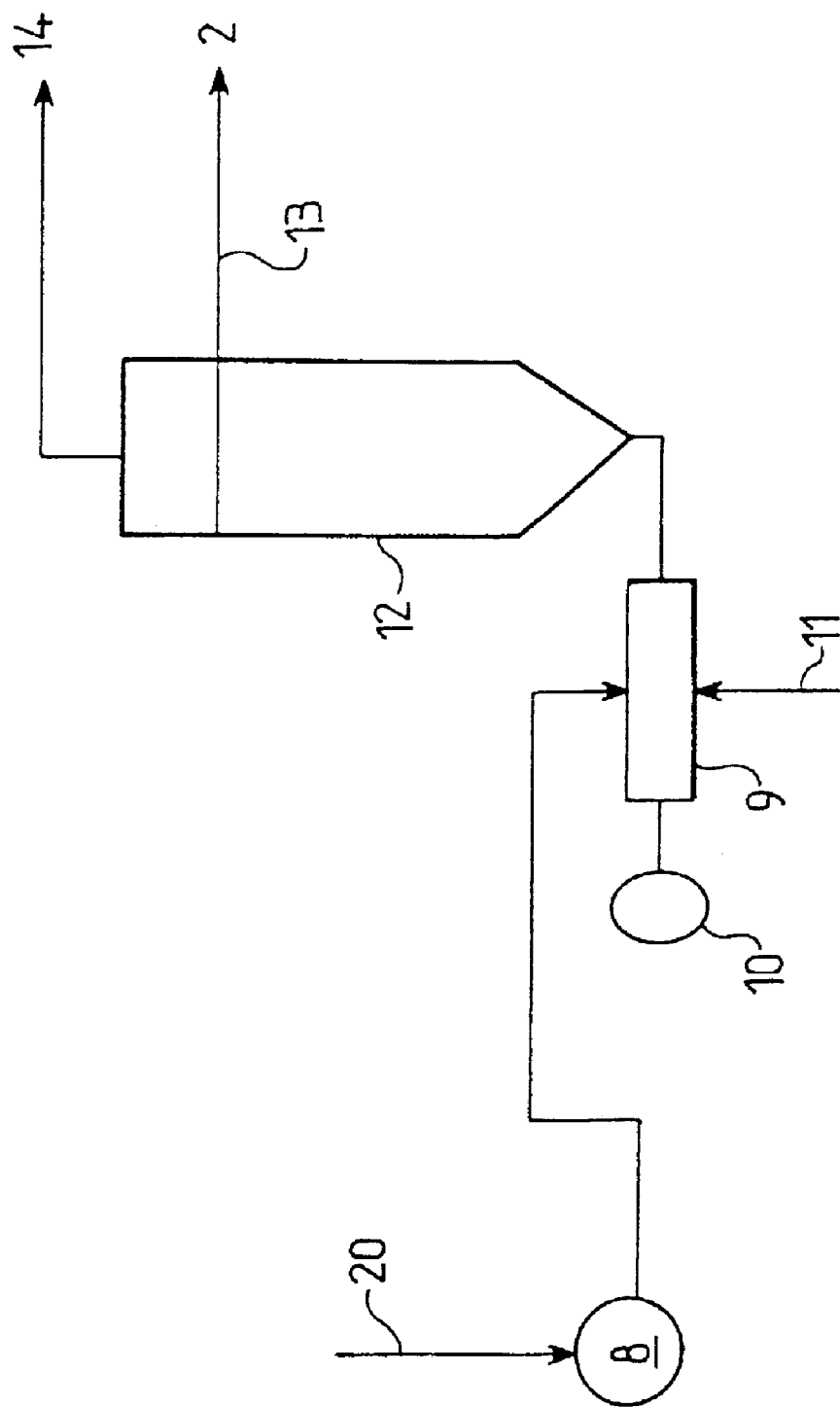
FIGS. 2 and 3 show schematically two embodiments of the means for degrading the sludge.

FIG. 2 shows an exemplary embodiment of an ozonation system 7 according to the invention. In this nonlimiting example, this system comprises a feed 20 for sludge coming from the biological reactor 2, a sludge feed or recovery pump 8 feeding a dynamic mixer 9 driven by a motor 10 and which is fitted with a pipe 11 for feeding an ozonated gas consisting of ozone mixed with a carrier gas which may be air or oxygen or a mixture of these two gases, the sludge and the ozonated gas being mixed in this dynamic mixer 9.

The system 7 further comprises a reaction chamber 12 in which the ozonated gas mixed with the sludge is used up, the contact time between the latter and the ozonated gas being between 10 seconds and 90 minutes, preferably between 5 and 30 minutes. The treated sludge is removed at 13 and recycled in the biological reactor 2. A system 14 for discharging the waste gas, for example to a unit for destroying the waste ozone, is provided. Advantageously, when the carrier gas consists of oxygen and when the biological reactor is an aeration tank, the oxygen can be sent back to the aeration tank with or without destruction of the waste ozone.

Figure 3:
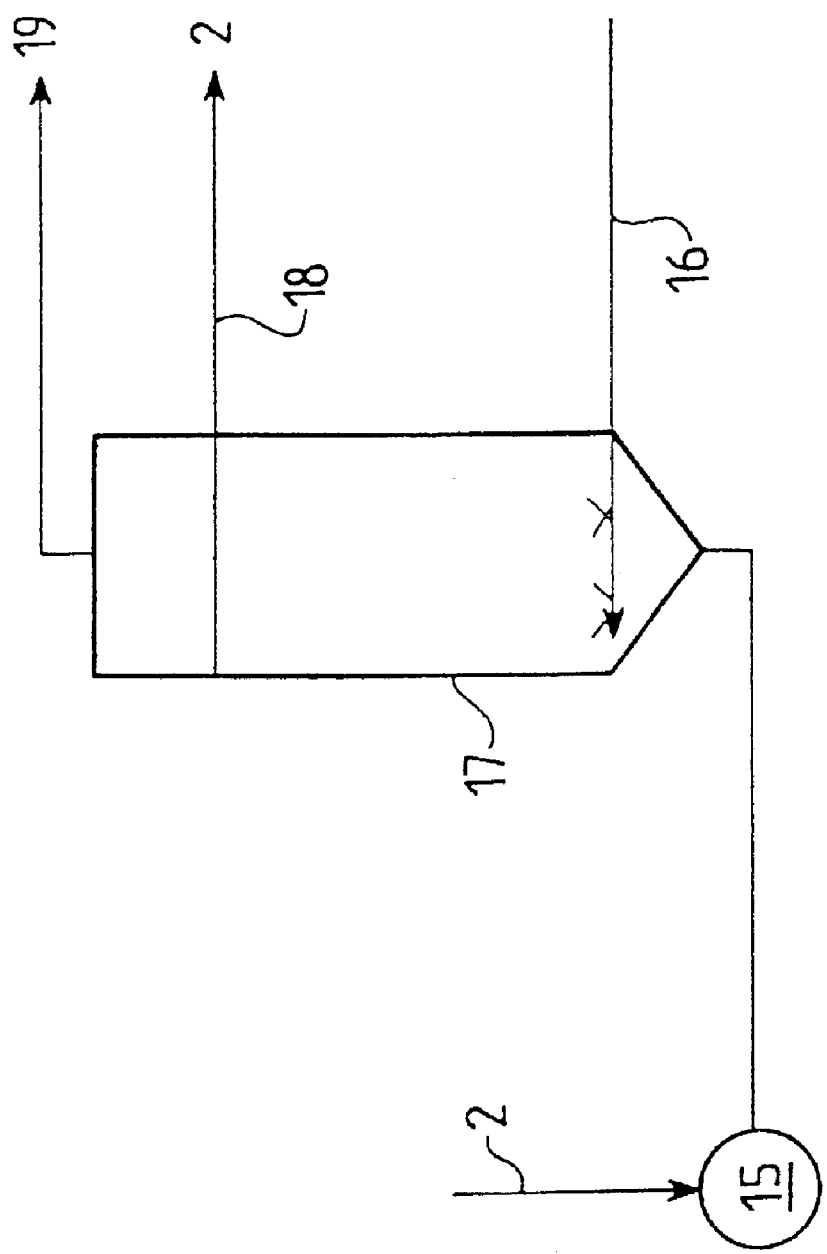

FIG. 3 shows another exemplary embodiment of the system 7 degrading the sludge by ozonation. In this exemplary embodiment, this system comprises a reactor 17 for bringing the ozone into contact with the sludge to be treated, the latter being taken from the biological reactor 2 via a feed or delivery pump 15, this reactor 17 being fitted with an inlet 16 for ozonated gas consisting of ozone mixed with a carrier gas which can be air or oxygen or a mixture of the two gases. Advantageously, the time of contact between the sludge and the ozonated gas bubbles is between 10 seconds and 90 minutes, preferably between 5 and 30 minutes. The sludge is removed at 18 so as to be returned to the biological reactor 2. The reactor 17 comprises, in its upper part, a means 19 for discharging the waste gas, for example to a unit for destroying the waste ozone. As described above with reference to FIG. 2, where oxygen is used as a carrier gas and when the biological reactor 2 is an aeration tank, the oxygen can be sent back to the aeration tank whether or not the waste ozone is destroyed.

Moreover, a reference example according to a conventional water treatment method and an implementational example of the method subject of the present invention are given below. The two methods have been implemented under the same load conditions with respect to applied mass and volume, and the biological water treatment method used was of the activated sludge type. Of course, these examples can be extrapolated to any type of biological methods whether they are of the type based on free or based on immobilized cultures.

1) Reference Example

An aeration tank having a volume of 200 liters was used as a biological reactor 2, the concentration of sludge in the aeration tank being 4 grams of SM per liter. The tank was supplied with raw water having the following characteristics:

Feed rate: 26 l/hour

TCOD: 300 mg/l

SM: 80 mg/l

The sludge production obtained after one month of operation amounted on average to 60 g SM/day, the sludge index amounted to 120 ml/g, which allowed settling rates of about 1 m/h, and the thickening factor after 30 minutes of settling was equal to 2.

The characteristics of the treated water were as follows:

TCOD: 45 mg/l

SM: 10 mg/l

Figure 5:
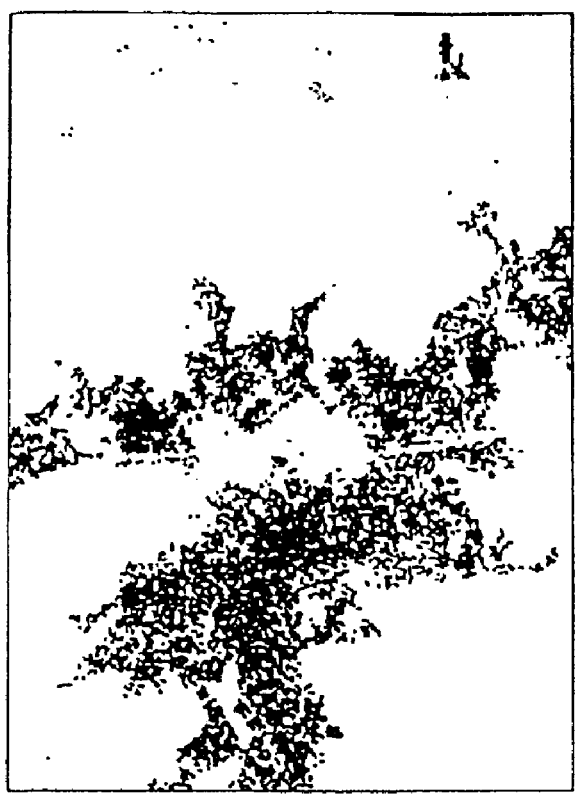
FIGS. 4 and 5 illustrate the appearance of the floc obtained according to the method subject of the invention and according to the prior art, respectively.

FIG. 5 shows the appearance of the floc obtained. The appearance of conventional floc was found from the activated sludge methods operating at low load with the presence of many protozoa; the volatile matter content of the sludge amounted to 75%.

2) Implementational Example of the Method of the Invention

The treatment conditions, the characteristics of the treated raw water and the concentration of the sludge in the aeration tank were the same as those of the reference example, but the sludge was subjected to an additional treatment by ozonation according to the present invention.

The ozonation treatment according to the invention was carried out so as to treat 800 g SM per day, that is the mass of the aeration tank per day, with an ozone dose of 5 g per kg of treated SM. The ozonation was carried out according to the implementational example of the invention illustrated in FIG. 2.

After one month of operation, the sludge production amounted on average to 5 g SM/day and the sludge index amounted to 30 ml/g, which allowed settling rates of about 4 m/h.

The characteristics of the treated water were as follows:

TCOD: 50 mg/l

SM: 10 mg/l

Figure 4:
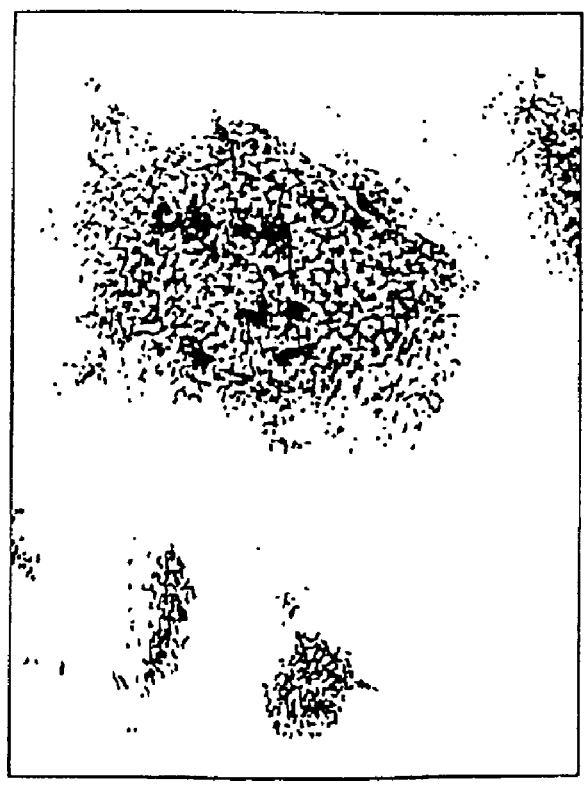

The appearance of the floc is shown in FIG. 4. It is in the form of small granules, whose mean size is greater than 200 microns, whose volatile matter content is 60% and whose thickening factor after 30 minutes of settling amounts to 6.

Figure 6:
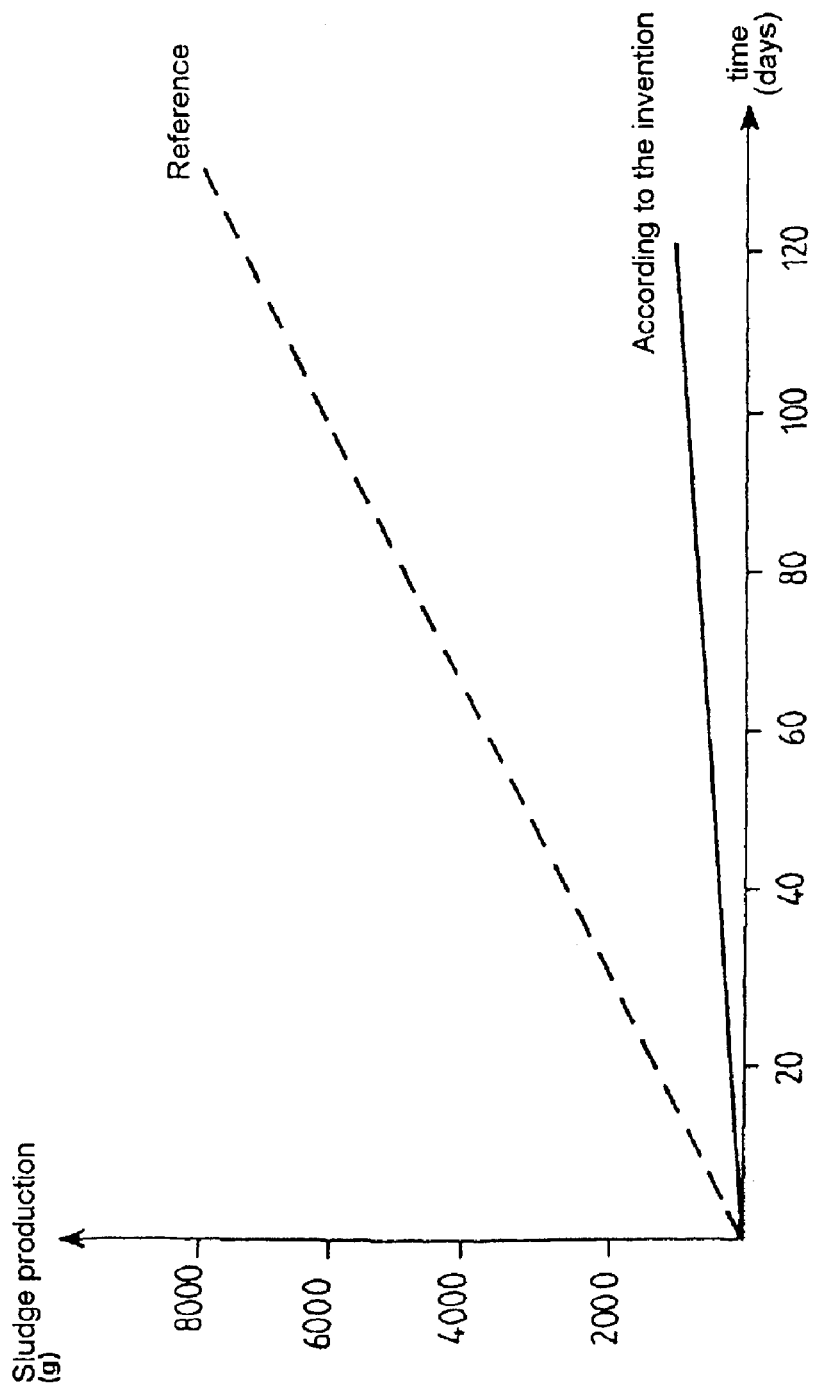
FIG. 6 illustrates the monitoring of the production of sludge as a function of time, for each treatment technology.

The monitoring of the sludge production, as a function of time, is shown in FIG. 6 for each treatment technology.

It was observed, quite surprisingly and unexpectedly, that the effects of the treatment according to the present invention continue to appear over time and that they are irreversible.

Compared with the reference example described above, the results mentioned above afforded by the method of the invention provide the following advantages:

increase in the hydraulic flows treated by the separator by a factor of 4 to 6;

significant decrease in the amount of sludge produced: the sludge produced may be twelve times less than that from a conventional method. Thus an amount of sludge reduced by 40 to 95% compared with a conventional treatment, without addition of chemical reagents was noticed;

the amounts of ozone used are small, which makes the method economically attractive because of the significant savings obtained in the costs of removing the sludge and in the investment cost of the station, especially because of the reduction in the dimensions of the liquid/solid separation device;

obtention of a sludge index, characterizing its settleability, less than 50 ml/g or even less than or equal to 30 ml/g, to be compared with the sludge index obtained for conventional plants (100 to 150 ml/g);

no particular seeding is needed.

Moreover, the partial oxidation of the sludge by the ozone leads to the production of organic matter which can be assimilated and used, in particular as nutrients in the denitrification step.

It is of course understood that the present invention is not limited to the implementational modes and to the exemplary embodiments described and/or mentioned above, but that it encompasses all variants thereof.

What is claimed is:

1. Method of purifying wastewater charged with organic matter which comprises a step of biologically treating the water, during which the organic matter contained in the water is degraded by micro-organisms thereby producing sludge, and a water-sludge separation step, the sludge coming from the separation step being recycled in the biological treatment step, this method being characterized in that it further comprises a step of degrading the sludge, coming either from the biological treatment step or from the separation step, during which the sludge is brought into contact with an ozonated gas under conditions making it possible to obtain a floc consisting of granules whose mean size is greater than 200 microns, the volatile matter content is between 50 and 65%, the thickening factor of this granular sludge, after 30 minutes of settling, always being greater than 4, the conditions for obtaining the said granular sludge consisting in:

treating between 0.1 and 2 times the mass of sludge present in the biological treatment step per day and preferably between 0.7 and 1.5 and, applying an ozone dose of between 3 and 100 grams of ozone per kilogram of treated suspended matter (SM), preferably between 4 and 10 grams of ozone per kilo of treated SM.

2. Method according to claim 1, characterized in that the step of degradation by ozone is implemented continuously.

3. Method according to claim 1, characterized in that the step of degradation by ozone is implemented batchwise.

4. Method according to any one of the preceding claims, characterized in that the time of contact between the ozonated gas and the sludge to be degraded by ozonation is between 10 seconds and 90 minutes, referably between 5 and 30 minutes.

5. Water treatment plant implementing the method according to any one of the preceding claims, which comprises a biological treatment reactor (2) receiving the raw water charged with organic matter which is degraded by micro-organisms thereby producing sludge and a solid/liquid separator (3) which receives the wastewater coming from the biological reactor and which separates the water from the sludge, a recycling loop (5) enabling at least part of the sludge thus separated to be returned to the biological reactor, this plant being characterized in that it comprises a means (7) for degrading the sludge, which collects part of the sludge coming either from the biological reactor (2) or from the separator (3) and subjects the sludge to an ozonation treatment, the sludge thus treated then being recycled in the biological reactor.

6. Plant according to claim 5, characterized in that the means (7) for degrading the sludge by ozonation comprises a dynamic mixer (9) accommodating, on the one hand, the sludge to be treated and, on the other hand, an ozonated gas, this mixer feeding a reaction chamber (12) in which the ozonated gas mixed with the sludge is used up, the sludge being recycled in the biological reactor (2) after treatment, the said reaction chamber further comprising a means (14) for discharging the waste gas.

7. Plant according to claim 6, characterized in that the time of contact of the sludge and of the ozonated gas in the said reaction chamber (12) is between 10 seconds and 90 minutes, preferably between 5 and 30 minutes.

8. Plant according to claim 5, characterized in that the means (7) for degrading the sludge by ozonation comprises a reactor (17) in which the ozonated gas is brought into contact with the sludge to be treated, the sludge being recycled to the biological reactor (2) after treatment, a means (19) for discharging the waste gas being provided at the upper part of the said reactor (17).

9. Plant according to claim 8, characterized in that the time of contact between the sludge and the ozonated gas in the said reactor (17) is between 10 seconds and 90 minutes, preferably between 5 and 30 minutes.

* * * * *